(12) United States Patent
Lück

(10) Patent No.: US 9,140,053 B2
(45) Date of Patent: Sep. 22, 2015

(54) STRUCTURAL ELEMENT (71) Applicant: Stefan Lück, Friedberg-Ockstadt (DE)

(72) Inventor: Stefan Lück, Friedberg-Ockstadt (DE)

(73) Assignee: Stefan Lück, Friedberg-Oeckstadt (DE)

( * ) Notice: Subject to any disclaimer, the term of this patent is extended or adjusted under 35 U.S.C. 154(b) by 0 days.

(21) Appl. No.: 14/353,973

(22) PCT Filed: Oct. 25, 2012

(86) PCT No.: PCT/EP2012/004453
§ 371 (c)(1),
(2) Date: Apr. 24, 2014

(87) PCT Pub. No.: WO2013/060455
PCT Pub. Date: May 2, 2013

(65) Prior Publication Data
US 2014/0291448 A1    Oct. 2, 2014

(30) Foreign Application Priority Data

Oct. 28, 2011   (DE) .......................... 10 2011 117 144

(51) Int. Cl.
*E06B 3/66* (2006.01)
*E06B 3/663* (2006.01)
(Continued)

(52) U.S. Cl.
CPC .............. *E06B 3/66304* (2013.01); *B64B 1/14* (2013.01); *E04B 1/803* (2013.01); *E06B 3/6612* (2013.01);
(Continued)

(58) Field of Classification Search
CPC ... E06B 3/6775; E06B 3/677; E06B 3/66304; E06B 3/6612; E06B 3/6715; E04B 1/803; E04B 2001/8452; Y02B 80/12; Y10T 29/49616

USPC ......................................................... 52/171.3
See application file for complete search history.

(56) References Cited

U.S. PATENT DOCUMENTS 2,638,187 A * 5/1953 Tate .............................. 52/792.1
3,470,049 A * 9/1969 Reusch .......................... 156/145
(Continued)

FOREIGN PATENT DOCUMENTS

CN    1202347 C    5/2005
CN    2740605 Y    11/2005
(Continued)

OTHER PUBLICATIONS

Chinese Search Report with respect to counterpart Chinese patent application 201280061105.7.
(Continued)

*Primary Examiner* — Andrew J Triggs
(74) *Attorney, Agent, or Firm* — Henry M. Feiereisen LLC.

(57) ABSTRACT

Using the lowest possible amount of resources, a system is to be provided with a structural element (1), which system allows the characteristics of a vacuum to be used in the construction sector in a particularly simple manner. In particular, with a substantial freedom from thermal bridges, it is possible to also subsequently insulate a building envelope, for example, in situ at the lowest possible cost and this insulation is to be flexibly adaptable to changes of the building envelope. For this purpose, the structural element (1) comprises two cover layers (2) arranged substantially parallel to one another and a closed frame structure (4) which is formed integrally with the cover layers (2) and is arranged between said cover layers (2) such that a gastight cavity (6) is formed, said cavity (6) containing a vacuum.

27 Claims, 1 Drawing Sheet

(51) Int. Cl.
*E06B 3/677* (2006.01)
*E06B 3/67* (2006.01)
*B64B 1/14* (2006.01)
*E04B 1/80* (2006.01)

(52) U.S. Cl.
CPC .............. *E06B 3/677* (2013.01); *E06B 3/6715* (2013.01); *E06B 3/6775* (2013.01); *Y02B 80/12* (2013.01); *Y10T 29/49616* (2015.01)

(56) References Cited

U.S. PATENT DOCUMENTS

| | | | | |
|---|---|---|---|---|
| 3,968,831 | A * | 7/1976 | Xenophou | 165/53 |
| 4,167,598 | A * | 9/1979 | Logan et al. | 428/34.1 |
| 4,231,202 | A * | 11/1980 | Dube | 52/171.3 |
| 4,268,126 | A * | 5/1981 | Mumford | 349/16 |
| 4,275,801 | A * | 6/1981 | Bschorr | 181/290 |
| 6,209,269 | B1 | 4/2001 | Valderrama | 52/171.3 |
| 6,955,026 | B2 * | 10/2005 | Misonou | 52/786.13 |
| 8,530,010 | B2 * | 9/2013 | Lenhardt | 428/34 |
| 8,765,247 | B2 * | 7/2014 | Park | 428/69 |
| 8,822,006 | B2 * | 9/2014 | Yoon et al. | 428/69 |
| 8,876,048 | B2 * | 11/2014 | Herrmann et al. | 244/119 |
| 2007/0243358 | A1 * | 10/2007 | Gandini | 428/119 |
| 2010/0279055 | A1 * | 11/2010 | Song et al. | 428/68 |
| 2010/0330310 | A1 * | 12/2010 | Lenhardt | 428/34 |
| 2011/0006159 | A1 * | 1/2011 | Herrmann et al. | 244/119 |
| 2011/0183119 | A1 * | 7/2011 | Rotter | 428/172 |
| 2013/0029082 | A1 * | 1/2013 | Park | 428/69 |
| 2014/0291448 | A1 * | 10/2014 | Luck | 244/123.14 |

FOREIGN PATENT DOCUMENTS

| | | |
|---|---|---|
| CN | 101048558 A | 10/2007 |
| DE | 3735463 | 5/1989 |
| DE | 10064873 | 7/2002 |
| DE | 10064873 A1 | 7/2002 |
| DE | 102010025784 | 1/2012 |
| JP | 2002071088 A | 3/2002 |
| WO | WO00/68540 | 11/2000 |
| WO | WO2006/003199 | 1/2006 |
| WO | WO2006003199 A1 | 1/2006 |
| WO | WO2009/118149 | 10/2009 |

OTHER PUBLICATIONS

Translation of Chinese Search Report with respect to counterpart Chinese patent application 201280061105.7.

* cited by examiner

STRUCTURAL ELEMENT

CROSS-REFERENCES TO RELATED APPLICATIONS

This application is the U.S. National Stage of International Application No. PCT/EP2012/004453, filed Oct. 25, 2012, which designated the United States and has been published as International Publication No. WO 2013/060455 and which claims the priority of German Patent Application, Serial No. 10 2011 117 144.8, filed Oct. 28, 2011, pursuant to 35 U.S.C. 119(a)-(d).

BACKGROUND OF THE INVENTION

The invention relates to a structural element, comprising two cover layers arranged substantially parallel to one another and a closed frame structure which is formed integrally with the cover layers and is arranged between said cover layers such that a gastight cavity is formed, said cavity containing a vacuum. It also relates to a method for producing a structural element of this type and to a building and a method for equipping said building. Structural elements and methods of this type are known, for example, from WO 2006/003199 A1.

One of the most important challenges for the future is to drastically reduce the consumption of raw materials. Particularly in the construction sector, considerable potentials remain unused both for future and for existing projects. This relates to both the consumption of energy through use, and to grey energy which is associated with the construction, maintenance and demolition of buildings. A further challenge is to gain renewable energy economically, as far as possible without competing against foodstuff production and nature conservation, and to make it storable.

In respect of the energy consumed through use of the building, focus has recently been aimed at improving heat insulation. With regard to consumed energy, particularly in construction, lightweight construction methods are being used. In both areas, attempts are being made here to use vacuum technology.

According to the prior art, in vacuum insulation panels (VIP) and vacuum insulation sandwich panels (VIS), a supporting core of fumed silica, mineral fibres or of other open-pore insulating materials is used which makes it possible to prevent the conduction of the latent heat of gas under relatively high residual pressures. As a result, long-term safeguarding of the vacuum in the panels should be allowed, with relatively low demands being imposed on the sheath. To maintain a high vacuum, the edges in particular of the panels would have to be configured with permeation-tight stainless steel, for example, which, compared to aluminised foil for example, would produce a greater heat conduction over the edge regions. The achievable U value would thereby be higher, particularly in the case of relatively small panels, compared to foil-sheathed VIPs.

However, in the case of vacuum insulation glazing (VIG), it is necessary to achieve a high vacuum since only small spacers, which must not obstruct the transparency, are fitted. Here, the particular challenge lies in the edge join which has to combine a minimal conduction of heat with maximum diffusion impermeability and a slightly flexible behaviour. Likewise, the ratio of volume to surface is problematic for the achievement and maintenance of the high vacuum and requires a very clean working as well as a superior cleaning of the surfaces before they are joined together.

Common to all the vacuum insulations which have been mentioned above and which correspond to the prior art is the fact that they are not produced on site in a construction process and are not adapted in size. Apart from a few exceptions (for example VIS by Thyssen Krupp), a subsequent evacuation is not possible, i.e. in the event of damage and loss of vacuum, the insulating effect is reduced to a minimum which, for example in the case of VIPs, corresponds to the current legal minimum standard in Germany (for VIG, a loss of vacuum implies virtually the complete loss of the insulating effect).

The desired service life of vacuum insulations of at least 20 to 50 years should correspond to the period of use of buildings. To protect VIPs from damage, they are integrated to some extent into (finished) structural elements. Consequently, however, a subsequent replacement upon loss of vacuum and checking the functionality of the insulating effect is relatively complex and, in addition to the high costs, contributes to the limited popularity of this technique.

SUMMARY OF THE INVENTION

It is therefore the object of the invention to provide a system, with the lowest possible use of resources, which system allows the characteristics of a vacuum to be used in the construction sector in a particularly simple manner. In particular, with a substantial freedom from thermal bridges, for example, it should also be possible to subsequently insulate a building envelope on site at the lowest possible cost and this insulation should be adaptable in a flexible manner when the building envelope is changed.

This object is achieved according to the invention in that the frame structure has a chamber containing a vacuum which is at a higher pressure than that of the cavity.

The invention proceeds from the consideration that resources could be saved in that the vacuum method should be used not in ready-produced, possibly bulky components, but in structural elements such as panels which can be assembled and evacuated in situ. Structural elements of this type can be flexibly assembled in situ to produce outstandingly stable elements of any size which have an outstanding insulating effect. This can be achieved in that the structural elements have a sandwich cross section. Sandwich cross sections are composite cross sections. They consist of a moderately shear-resistant core which is joined to two outer, axially rigid cover layers in a shear-resistant and tensile-resistant manner. The cover layers can each be resistant to bending. Each layer per se satisfies the requirement of evenness of the cross section, but the total cross section does not.

However, unlike the known sandwich construction methods, for use in the vacuum region the core structure must be able to be evacuated over the entire surface without great flow resistances and must also withstand atmospheric pressure in the evacuated state without being bonded to the cover layers. This can be achieved by two cover layers, arranged parallel to one another, and by a closed frame structure introduced between said cover layers, cover layers and frame structure being separate components and being formed integrally with one another such that a gastight cavity is produced which can then be evacuated. This can be achieved by a vacuum pump which is connected to the structural element by a connection in one of the cover layers or in the frame structure and produces a corresponding vacuum in the cavity. Here it is unimportant whether both the frame structure and the cover layers are fixed components in the form of struts and boards, or whether the frame structure and/or cover layers are flexible and are formed integrally with the respective other component. The criterion is that following the joining procedure, the component is so tight that after evacuating to the ultimate pressure which is to be achieved (or lower), permanent operation of a vacuum pump is no longer necessary. Atmospheric pressure then provides in any case a permanent non-positive connection between cover layers and frame structure.

There are various possibilities for the vacuum-tight configuration of the edges in the invention. The closed frame structure must be configured as a peripheral seal such that it is able to withstand atmospheric pressure which acts on the edge. A vacuum-tight film adhesively bonded to the cover layers or a suitable elastomer can assume this task if they are supported against atmospheric pressure by a lattice which surrounds the core structure towards the edges.

A further possibility is to provide a flexurally resistant board with elastomer seals on both longitudinal sides so that the final height of this board including the seals has a slight excess relative to the core structure and the width of the support surface towards the cover layers is calculated such that the board does not tilt (similar to a double T-girder). Evacuation compresses the elastomer seals so that the excess is reduced to the dimension of the core layer at the ultimate pressure and there is no longer an excess of the resulting structural element at the edge.

To provide additional safeguarding against a loss of vacuum, after evacuation the peripheral seal is provided with a further barrier layer. For this purpose, the frame structure has a chamber containing a vacuum which is at a higher pressure than that of the cavity. A determining factor for the leakage rate (loss of vacuum) from the cavity is, inter alia, the pressure difference between the vacuum and the atmosphere outside the vacuum. If a high vacuum is to be achieved in the cavity of the structural element, the number of residual molecules being significant for said high vacuum, then this high vacuum can be maintained in a considerably easier manner if the volume thereof relative to the enveloping surface thereof is great and in particular if this enveloping surface is protected by a fore-vacuum. For this purpose, the chamber can be provided, for example, with suitable connecting ducts to the transition regions between cavity and outer region. The fore-vacuum in which a viscous flow prevails can be produced by relatively simple vacuum pumps and can be easily maintained. Due to the two-stage configuration of the vacuum, it is possible to use, for example, flexible peripheral seals of EPDM and the demands imposed on the cover layers also decrease.

The described arrangement also particularly allows a high vacuum insulation. Further chambers can also be provided so that a multi-stage vacuum system is produced in which a plurality of vacuum pre-chambers surround a high vacuum chamber at least in the peripheral regions or even entirely. When a high vacuum chamber with a molecular flow is surrounded by atmospheric pressure, the demands made on the envelope are extremely high. Depending on the permeability of the envelope, new molecules are continuously "pressed into" the high vacuum chamber from outside and have to be removed again, for example by a turbo molecular pump or by suitable getters. This procedure is distinctly more complex than maintaining a rough vacuum of, for example, 1 mbar residual pressure in which a viscous flow prevails.

The leakage rate of vacuum systems is determined by the pressure differences between a vacuum chamber and the surroundings. If there is a pressure difference of 1000 mbar, then the leakage rate is 1000 times higher than would be the case for a pressure difference of 1 mbar. This means that by reducing the ambient pressure to a rough vacuum, a large area of the high vacuum chamber can be protected by, for example, elastomer seals which are significantly more adaptable than, for example, metal seals. They also afford the advantages of reusability, low thermal conductivity and flexibility for a varying material expansion of the installed elements joined by the seal.

A further advantage is provided by the fact that a comparatively expensive high vacuum pump does not have to be permanently connected to the system. It is sufficient for a vacuum pump which can economically maintain a residual pressure of, for example, 1 mbar even over relatively long distances to be integrated into the system. For the high vacuum chamber, it is expedient for connections for a high vacuum pump to be provided at appropriate intervals, via which connections the chamber can be evacuated or re-evacuated.

To minimise the remaining conduction of heat over the necessary supporting framework, it is also advantageous to choose a multi-layered construction. If the outer layers according to the described type are configured as a sandwich structural element which can be evacuated, then the stability thereof is great enough for the atmospheric pressure to be retained with a significantly lower number of supports in the central high vacuum chamber. This entails a further significant reduction in the passage of heat.

In an advantageous configuration, a spacer element is arranged between the cover layers. One or more spacer elements of this type stabilise the cover layers in the case of relatively large-area structural elements so that they do not collapse under atmospheric pressure during evacuation. Due to the fact that the load of the atmospheric pressure on the cover layers is assumed by one or more spacer elements as the core structure and that this is thereby also crucial for the stability of the structural element, the frame structure forming the peripheral seal can be optimised more independently with respect to avoiding a loss of vacuum.

A particularly simple construction is provided in that the spacer element is advantageously configured in the form of a bar and extends vertically to the surface of the cover layers. In this context, the spacer elements configured as supports can have any desired cross section, for example a circular or rectangular cross section.

In an advantageous configuration, the respective spacer element has thickening regions on its sides facing the cover layers. This allows a larger support surface at the ends so that the positioning which is vertical to the cover layers is stabilised and bending is avoided.

A plurality of spacer elements is advantageously interconnected in the manner of a lattice. This allows a fast assembly of a plurality of spacer elements, since not every element has to be arranged individually, but a plurality of spacer elements can be arranged quickly in a standardised manner. At the same time, the position of the spacer elements is stabilised during arrangement, but particularly also during evacuation. Finally, a lattice-type connection allows a particularly space-saving transportation: a plurality of lattices can be stacked in a staggered manner one inside the other. They can also be fitted with appropriate hinges, thereby allowing the lattice structures to be pushed together.

An advantageous embodiment of this lattice-type connection is a truss or lattice binder which, for example, can be produced very economically in injection moulding processes or in metal diecasting methods. In contrast to the known variants of lattice girders which are already used in the building industry, here the production of the joints which interconnect the bars does not present any additional working steps. The demands imposed on making the mould and on the machines for producing these elements are likewise very low compared to the production of bulky large-area elements because, for example, the cooling times can be kept very short due to the minimal and uniform use of material.

These truss or lattice binders can be produced with any radii and they serve as a forming structure. For example, using standard sheets from the roll, it is possible to produce components with a single curve for which no further technical devices have to be kept in stock. A comparison with the outlay necessary to achieve the same objective using a lightweight honeycomb board illustrates the cost-reducing potential of this construction method. A further example of the advantage compared to the prior art is a comparison with round formwork for concrete construction. The cost of materials for this special formwork is so high that even the handling of the individual elements is a logistical challenge.

The combination of forming elements (for example the mentioned truss or lattice binders) with spacers which are joined in the centre ("at half height") is particularly advantageous. Spacers which are joined together in this manner easily adapt to different radii and reduce the need for forming elements. This reduces the number of moulds required for the production of the forming elements, and also the storage of these special parts.

Furthermore, in an advantageous configuration, a connecting means is introduced between the cover layers and the frame structure and/or between the boards and the respective spacer element. As a result, the structure is stabilised even when the vacuum is lost through leakage or damage. The connecting means can also be configured to be strong enough to achieve a lasting stability without vacuum.

In a further advantageous configuration, the connecting means comprises an adhesive bond. This can be realised technically in a particularly simple manner. A thermoplastic adhesive is advantageously used here, so that by heating the bonding point, the bond can be undone without destruction.

In a further or alternative advantageous configuration, the connecting means comprises a mechanically separable connection. Examples of such possible connections are Velcro®, snap fasteners, snap locks or the like which can be adhesively bonded between the respective layers. This mechanically separable connection can be connected before the final join either to the frame structure or spacer elements or to one of the cover layers. The final join under vacuum below atmospheric pressure ensures that the connection is incorporated without tension. A mechanically separable connection has the advantage that cover layers can be replaced without being destroyed after a pressure equalisation with the surroundings and at the same time, it is ensured that the cover layers do not become detached from the core structure (frame structure and/or spacer elements) if vacuum is lost. Since most adhesives are not particularly peel-resistant, a Velcro® strip, for example, can be peeled off from a cover board. This facilitates the reuse of the installed materials and ensures a relatively simple recycling according to material type.

A material which increases the coefficient of static friction is advantageously introduced between the cover layers and the frame structure and/or between the boards and the respective spacer element. Here, an elastomer, for example, can be used. The force locking by atmospheric pressure after evacuation of the cavity is improved thereby and increases the stability.

Furthermore, a material which increases the coefficient of static friction coefficient under the effect of pressure is advantageously introduced between the cover layers and the frame structure and/or between the cover layers and the respective spacer element. Consequently, the force locking is only increased under the effect of pressure and it is possible to position the cover layers when the cavity has been only slightly evacuated. For example, a layer having a low friction resistance (for example Teflon) can be inserted which, as stated, allows the individual layers to be positioned relatively easily under a slight vacuum and which is arranged such that, in the case of a strong vacuum, it is pushed away and thus becomes ineffective. Here, an elastomer could be used, for example, which is notched on one side and is coated on this side with Teflon or the like. When there is a higher pressure on this layer, the elastomer folds over and the greater friction resistance of the elastomer comes into effect.

The cover layers are advantageously curved. As a result of the curvature, the stability is increased with the same use of material, or with a lesser use of material, the same stability is achieved as without a curvature. In particular, the number of necessary spacers is reduced and allows easier evacuation of the core construction. Likewise, the leeway for additional installations is increased, since fewer spacer elements are taking up volume. In a further advantageous configuration, the cover layers can also be curved several times. The stability of multi-curved structures is significantly superior to that of singly curved structures and the reduction in use of material and in spacer elements can turn out to be even greater.

If a structural element with relatively large dimensions is produced, it may be expedient to divide the cavity into a plurality of portions. For this purpose, the cavity advantageously has a gastight partition wall. However, small portions in a large body are advantageous if it is a matter of maintaining the vacuum. If, for example, the cover layer is damaged, then the vacuum is only lost in a small subregion. The remaining regions continue to retain their insulating characteristics and their stability.

However, during the evacuation procedure, a uniform cavity which is configured as far as possible without relatively great flow resistances in the interior is advantageous. Consequently, the number of connections required for a vacuum pump is lower and it is possible to dispense with additional vacuum lines outside the cavity to be evacuated. If a high vacuum is to be achieved, a large cavity is possibly the only alternative to using a plurality of vacuum pumps or to repeatedly implementing the vacuum pump due to the lack of a preferred direction of the molecular flow. Therefore, the division should be reversible, i.e. the respective partition wall has an opening which can be closed in a gastight manner. The openings are configured such that in a normal case during use they are closed, but can be opened to check the quality of the vacuum and for re-evacuation purposes. These seals can be configured (note: similar principle to air locks in submarines for example) in the manner of ventilation elements from the building industry, for example, which can be closed by pushing or rotating, but it should be ensured that in the evacuated state of the elements, the seals can withstand atmospheric pressure on both sides. If a cover layer is damaged in one area, then only the vacuum unit formed by the surrounding seals becomes ineffective, the adjoining units remain unrestrictedly effective at least in their stability and, depending on the demands and technical expense for the seal, the effectiveness can be ensured until a high vacuum is achieved.

In the event of damage, the pressure difference between the evacuated regions and atmospheric pressure in the damaged region will, in most cases, make it impossible for the seals to open. Following repair to the cover layer, to regain the functionality of the entire element without an additional connection for a vacuum pump in the repaired region, it is expedient to provide bypasses between the individual regions which can provide a pressure compensation and which are always closed in a normal case. These bypasses can be very small in cross section and can be produced at a low constructive expense and are merely an emergency system. The entire element should preferably be subsequently re-evacuated to the desired ultimate pressure to keep the flow resistances and thereby the evacuation time as low as possible.

In a further advantageous configuration, a porous material, in particular a pourable, pressure-resistant material, is arranged between the cover layers. The use of, for example, mineral wool for heat insulation and as a fireproofing layer is particularly suitable, especially in industrial applications.

At present, VIPs are rarely used, although the heat conductivity could be significantly reduced by a vacuum insulation. Vacuum insulation systems have only become established in cryogenics. The reasons for this lack of popularity are the difficult handling of the sensitive VIPs, available hitherto, the lack of fire resistance of the envelope, the lack of adaptability to existing pipes, containers, connections etc, as well as the legal framework (regulations) and the lack of trained personnel for planning and implementing the vacuum insulation.

For industrial applications, but also for other applications, the described structural element affords the possibility of additional, outstandingly effective heat insulation at comparatively minimal additional costs compared to the prior art. The insulation thicknesses are measured according to cost-effectiveness, particularly in the industry. These calculations also include the additional space requirement which is needed for an increase in the insulation thickness and which often cannot be provided at all in existing installations.

According to the described manner, during the insulation of pipes, for example an evacuatable core structure with an inner covering of perforated plate (or similar evacuatable cover layers) and an outer vacuum-tight cover layer can be used as an outer replacement for the conventional sheet-metal shell around the mineral wool layer. If this outer sheath is joined at the ends in a vacuum-tight manner with the pipe, then this piece of pipe can be provided with a vacuum having a residual pressure of, for example, 0.1 mbar. In this region, in the outer core layer there is still a viscous flow, but in mineral wool, at this low residual pressure, the free path length of the molecules is already greater than the pore size. The heat conduction via the gas in the mineral wool layer is prevented thereby and the insulating effect of mineral wool is increased to a multiple compared to the non-evacuated state. Particularly in industrial applications and in power plant processes with temperature differences of several 100° C., this additional measure can save a considerable amount of energy, without basically using other materials having unknown characteristics. Since the natural insulating effect of mineral wool is retained even during a loss of vacuum, the relatively long evacuation period (depending on pump size and thickness of the mineral wool layer), which results due to the flow resistances in the mineral wool layer, is not an obstacle for the use of the invention. Protection of the materials inside the sheath, for example against moisture penetration and corrosion, is an additional benefit of this method.

Heat-insulating and sound-absorbing fire walls, for example, can also be built according to the same inventive principle. Mineral wool layers with adjoining vacuum-tight cover layers are attached to an evacuatable core structure with bilaterally attached perforated sheets and are then evacuated. The thickness of the wall is reduced by this process if spacers do not provide a clearly defined distance between cover layer and core layer, since the mineral wool is compressed by atmospheric pressure.

A configuration of this type with perforated plates can be particularly advantageous in the use of a structural element, for which it is anticipated that the cover layers will have to be changed relatively often during the course of use thereof. Here, the perforated plate can also be configured as a narrow-mesh lattice. This can be configured towards the cover layer such that, for example, a plurality of small elastomer dots or strips provide an evacuatable layer between lattice and cover layer, without producing high concentrated loads on the cover layer.

With a planned backfilling of the outer element, it is expedient to provide a substantially (dust) tight, yet air-permeable non-woven material on the side of the lattice (perforated plate) facing the cavity.

Depending on requirements and intended use, the mentioned method can naturally also be combined with other open-pore insulating materials (and in part without a comparable fireproofing function). Alternatively, for example, the cavity can be filled with a pourable material which is pressure-stable and non-compressible. Likewise, the resulting element can be used as a permanent shuttering for concrete or other materials which are to be introduced in liquid form and then solidify, and foaming of the finished structural element is also possible.

This is particularly preferred when a fixed element is to be produced which is universally pressure-resistant. The demands made on the original core structure (which then assumes the task of reinforcement, for example) and also on the cover layer (which can be thinner) are reduced. Concentrated loads acting on the cover layer, as are produced without filling material by atmospheric pressure, are avoided.

In the case of a multi-layered structure of a vacuum insulating element, backfilling a preferably outer layer can significantly increase the mass of the component. Particularly in the building sector, a solid construction method can be required to achieve noise reduction, but also thermal storage mass. Although the propagation of sound waves is inhibited in a vacuum (of low residual pressure), structure-borne sound can still be transmitted by the supporting construction, which can be a serious problem particularly in lightweight constructions.

A simple variant particularly for temporary structures is to backfill the outer elements with sand. Sand has a high density, an outstanding pourability and is locally available almost everywhere. Thus, for example for temporary noise-insulating walls, only the "lightweight components" and the construction accessories (inter alia vacuum pump) have to be stocked and supplied, whereas sand does not generally present any particular logistical challenges.

In a further advantageous configuration, a pipe connected to the outer region is arranged in the cavity and/or chamber, i.e. a pipe leads through the evacuated regions, the respective open ends of said pipe being connected to the outer region. Consequently, supply lines can be easily insulated. As a result, it is also possible, in contrast to the previously customary individual insulation of pipes (prefabricated supply lines are also supplied in which, for example, feed and return are jointly provided with one insulation), to jointly insulate a plurality of lines with different temperature levels so that the result is significantly better with lower costs than in the case of prior art insulation measures.

To achieve a vacuum insulation which works by preventing convection and thereby already matches the insulating effect of very good insulating materials, a common outer sheath can encompass the pipes. This sheath can be adapted and configured in situ according to the described [ . . . ] with an evacuatable frame structure and two cover layers and must be adhesively bonded non-positively at least on the side facing the pipes (if there is a higher pressure in the sheath than in the region surrounded by the sheath, this layer will otherwise become detached and will be pushed in the direction of the pipes by the residual pressure). Thereafter, the region in which the pipes are located can be evacuated to 1 mbar, for example. Since radiation is not prevented by the vacuum, it is expedient to provide the pipes with a layer which reflects strongly in the heat radiation range and to possibly attach additional reflecting layers (for example MLIs) between the pipes.

Due to the high inherent stability of the sheath, the number of inner struts required for the entire construction to protect against bulging or bending due to the atmospheric pressure load is relatively low or, if the sheath is configured cylindrically, is equal to zero. For logical reasons, necessary struts are to be configured as an attachment option for the suspension of the pipes to keep the material requirement low and to minimise the heat conduction via the pipe mounts.

If greater demands are made on the insulation, it is expedient to provide single pipes or also a plurality of pipes (at a comparative temperature level) with their own rough vacuum insulating layer in the described manner including reflecting layers and to then encase them with a common sheath, as described above. The region between the pipes can then be evacuated up to a high vacuum, thereby affording the best possible thermal insulation for the supply lines.

In general, it is expedient to provide empty conduits for pipes to be subsequently integrated, analogously to empty conduits in the building industry which empty conduits are also evacuated. If a pipe is then additionally introduced, this empty conduit can be ventilated and the pipe can be inserted. The space between pipe and empty conduit is then re-evacuated. This method can also be used for electrical lines. A great advantage of this method is the protection of the materials installed in the vacuum atmosphere against corrosion and dust, and this has a particularly positive effect on the reflecting layers, since the efficiency thereof is thus fully maintained over the period of use, in contrast to the prior art. Of course, pipes can also be subsequently integrated into walls, ceilings or other elements. Likewise, heat and cold storage systems, for example, can be jointly insulated in this manner.

In a further advantageous configuration, a pipe as a heat exchanger is integrated into the respective cover layer. To use low energy, it is expedient to configure heating surfaces to be as large as possible (also applies to cooling). Underfloor and wall heating as well as chilled ceilings have become firmly established in the building industry, because by controlling the temperature of large surfaces, it is possible to achieve a more uniform and thus better result than via smaller heat exchanger elements and the temperature difference between heating surface and room to be heated (but also container etc.) can be kept lower. The heat transfer thus takes place more intensively by radiation (in the case of liquid-filled containers by heat conduction) than by convection and is perceived by people to be more pleasant. Likewise, in the case of a balanced radiation climate, the air temperature can be kept lower without being perceived as cooler. This entails significantly lower ventilation losses.

The integration of heat exchangers can also improve safety and can be an alternative to direct electrical pipe trace heating systems, for example, which protect supply lines from freezing.

If a structural element is produced in the described manner, then in contrast to prior art sandwich construction methods (honeycomb core, foamed core etc.), the evacuatable core structure makes it possible to integrate pipes without the core layer being cut. This can preferably be carried out using prefabricated metal sheets which encase a pipe and are provided with a slight outwards curve, as well as with a splay which can be fixed reversibly in the core structure. The slight prestress in the direction of the outer cover layer ensures that during evacuation of the component, the metal sheet is pressed onto the cover layer and the heat can be transferred over a large area. The back of the metal sheet should preferably be provided with a layer which is strongly reflective in the thermal radiation range in order not to have any loss of heat by radiation (in the wrong direction). With this type of heat exchanger, the thermal mass is very small and allows a very fast controllability of the temperature level. In contrast to prior art surface heating systems which are installed in a screed layer, for example, and thereby have a passive behaviour, it is thereby also possible to heat or cool temporarily used rooms for a short time with minimum use of energy.

When the structural elements are evacuated, during the cooling function there is a further advantage over the prior art in that it is quite safe in terms of building physics not to meet the dew point in the wall (on the side remote from the room), because due to the vacuum there is no moisture which can condense.

As a result of the small contact surface with the core structure, the conduction of heat in the wrong direction is also minimised to such an extent that the disadvantage of increased heat loss of a prior art wall heating system in outer walls effectively no longer exists.

A further possible application is found in container construction. Here, for example in the case of water reservoirs, it is possible, with a low use of energy to specifically prevent ice formation in the peripheral region of the container. At cold temperatures, if ice only forms in the centre of the container, this ice can float freely while the peripheral region remains ice-free and is not damaged by the spread. This method is also outstandingly suitable as a safety system for salt storage systems in solar-thermal power stations, inter alia, in which a temperature-related change from the liquid to the solid phase leads to the destruction of the entire storage system and thus entails immense economic damage.

Great advantages are also afforded by the integration of heat exchangers according to the described method in external walls and roofs which are produced in the sandwich construction method according to the invention. Thus, for example opaque surfaces can be used as solar absorbers, also as (additional) collectors for a heat pump.

Roof surfaces, configured in the described manner, can be used as a cooling collector, particularly during clear nights in which the radiation equalisation with the night sky provides a supercooling of the roof surface below the ambient temperature and they contribute significantly to reducing the cooling loads of buildings and technical facilities. Since only the current for the pumps has to be used for this purpose, this solution is eminently suitable for reducing the energy consumption compared to the prior art (air-conditioning systems).

The integration of heat exchangers into roof surfaces, but also in circulation areas provides the further advantage that, with low energy, it is possible to prevent these surfaces from icing over for example; likewise it is possible to facilitate snow sliding off sloping surfaces. In the case of extreme depths of snow which endanger the statics of buildings (particularly in the case of flat roofs), it is also possible to melt the snow by supplying thermal energy.

With regard to the method for producing a structural element in which two cover layers are arranged parallel to one another, a closed frame structure is formed integrally with the cover layers, the frame structure is arranged between the cover layers such that a gastight cavity is formed and said cavity is evacuated, the object is achieved in that before the cavity is evacuated, a chamber of the frame structure is evacuated, said chamber having a higher pressure than that of the cavity. This production method affords the advantage that cover layers and frame structure can be produced and transported to the construction site in a space-saving manner, for example they can be stacked one inside another. The assembly and evacuation procedures are then carried out in situ. In this respect, before the cavity is evacuated, a chamber of the frame structure is evacuated, said chamber having a higher pressure than that of the cavity. Consequently, a fore-vacuum can be produced here which allows a low-leakage, high vacuum in the cavity.

In this context, a spacer element is advantageously arranged between the cover layers, which increases the stability of the structural element.

If a mould for the production of curved structures, for example, is already provided, it is also possible to completely dispense with forming elements in the structural element. In this context, in an advantageous configuration, cover layers and frame structure are arranged on an inner or outer mould. This method is particularly significant in the case of non-forming parts for cover layers and frame structure: a non-forming core structure and non-forming cover layers are placed flush on a mould and they assume this shape by subsequent evacuation and retain it. In a further advantageous configuration, the mould is configured as a vacuum table. The cover layer resting on the mould can firstly be adapted to the form by evacuation and then the frame structure with the second cover layer can be adapted to this form. This also allows the addition of further layers according to the same method.

In contrast to other production methods for boards and elements, in the invention the cycle times can be reduced to a minimum and the degree of utilisation of moulds can be greatly increased. If, for example, the mould of an evacuatable layer and a surface of, for example, perforated plate is provided (perforated plate represents all surface layers capable of allowing an adequate passage of air for evacuation with a satisfactory stability) and is thereby configured as a vacuum table, then the first cover layer can be initially introduced into the mould and then the core layer with the second cover layer can be joined to the first cover layer by evacuation. After release from the vacuum table, atmospheric pressure ensures that the element remains stable and that, for example, adhesive layers can cure without a further pressure device. In addition to the advantage that a unilateral mould is sufficient and no mechanical pressure has to be exerted, due to this production method the cycle times can be reduced irrespective of the adhesive drying times. Thus, the use of spontaneously curing adhesives (for example under UV light or by supplying thermal energy) to reduce cycle times is no longer necessary.

In an advantageous configuration, a building comprises a described structural element and/or a structural element produced according to the described method.

In this respect, a plurality of structural elements is advantageously attached to a framework structure. The framework structure forms a supporting frame for static stability, into which supporting frame the structural elements are introduced as wall elements.

In an advantageous configuration, the framework structure is formed at least partly from steel. This provides a stable holding construction.

A vacuum pump is advantageously connected to at least one cavity. This provides a reliable maintenance of the vacuum in the installed state of the structural element.

The interior of a component of the building is advantageously completely evacuated. The construction method with evacuatable cavity profiles is outstandingly suitable for the production of very large-volume, inherently stable components. If these are preferably configured to be rotationally symmetrical, then it is possible for them to be completely evacuated with a stable form.

Subject to the size of the entire component and to the weight of the materials used, by evacuating the content of the component, it is possible to achieve a significant reduction in weight which means that the component can be moved at least with significantly less use of energy or becomes so light that the weight thereof is less than that of the displaced air.

During construction of cooling towers, solar chimney power plants or other rotationally symmetrical constructions, production can be carried out horizontally and the entire envelope can then be brought into a vertical position. The use of cranes and formworks for construction is thereby substantially avoided and, depending on requirements, the envelope can be used as a permanent shuttering. Holding means for pouring in concrete or other filling materials can be integrated during construction.

In a method for equipping a building, a described structural element and/or a structural element produced by the described method is advantageously arranged on the building.

This method is also outstandingly suitable for subsequently providing existing surfaces and bodies with one or more additional layer/s, i.e. a structure already present on the building advantageously forms one of the cover layers. These layers can assume a plurality of additional tasks, in addition to the resulting new surface. One area of use is, for example, the permanent drainage of soaked components. Following a flood, for example, building dryers which have a high power requirement are often used. If, instead of drying using building dryers, a surface to be dried is surrounded with, spacers, a vacuum-tight peripheral seal and a vacuum-tight cover layer and is evacuated to a rough vacuum using a vacuum pump, the boiling point of the water is reduced to about 33° C. Due to the pressure difference between the wall to be dried, the vacuum and the outside of the wall, a clear orientation of the flow to the vacuum pump is produced. A substantially airtight termination of the wall to the outside is required for this method, but in most cases can at least be subsequently ensured.

In constructions for which a subsequent external insulation is impossible (lack of space, listed building, inter alfa), with this method an internal insulation is possible which is quite safe in terms of building physics. If the outside is coated with a diffusion-tight layer and if the inside is configured in the manner stated above, then the additional advantage is provided that, for example, mould cannot spread or re-grow in the "vacuum atmosphere". Since vacuum is an environment which is hostile to life, many problems which have resulted in the past with (incorrectly implemented) internal insulations are thereby already avoided to some extent. Contaminated buildings (mould, oil damage after a flood, etc.) which would otherwise be uninhabitable can also be made habitable again by the (approximately) hermetic sealing and the specific removal of the loaded air by the vacuum pump, with the subsequent possibility of deposition or filtering.

Depending on use, it can also be advantageous to apply further layers. If, for example, a heat accumulator filled with water is insulated or produced, the vapour pressure prevailing in a further pre-chamber can be reduced. Also in the case of internal walls of houses, for example, a layer can be applied with a slight vacuum and connected to an acoustic alarm system, for example. If, for example, a wall is drilled, then this first layer can easily be resealed by a seal and the next attached layer can be protected against damage, for example, by a ceramic surface. It is possible to avoid the disadvantages of conventional vacuum insulations due to the restrictions for the user (pictures/wall cupboards cannot be hung on the walls) by suitable fastening means which divert the forces in the first vacuum plane.

Finally, an aircraft advantageously comprises a rotationally symmetrical lift body with a described structural element and/or with a structural element, produced by the described method, the interior of the lift body being evacuated and thereby being lighter than air. Previous lighter-than-air technologies mainly use hydrogen or helium as "lift means". While hydrogen is likely to be used only in exceptional cases due to the risks involved in dealing with it, the availability and price of helium are seriously limiting factors. The pressure difference resulting during evacuation of, for example, a cylindrical component between atmospheric pressure and the content of the component requires a very stable sheath structure. The previously described sandwich construction method provides the necessary stability.

A great advantage over, for example, airships with conventional lifting gases is the possibility of being able to provide a fast balancing and a targeted, fast landing by the deliberate flooding of relatively small separated segments in the hollow body, without the use of additional ballast. The pressure difference existing at atmospheric pressure facilitates this task. Likewise, expensive lifting gas is not lost during this procedure; the flooded regions merely have to be evacuated again.

The extremely simple construction method and the outstanding recycling ability afforded by the invention provide completely new purposes of use for the lighter-than-air technology. Thus for example, an "airship" can be built, the envelope of which serves on-site as the housing. In the event of catastrophes, such as earthquakes, when the entire infrastructure is destroyed, the transportation of relief supplies is a logistical challenge which is difficult to meet. With a "one-way airship" of this type, the material itself required on site becomes the transportation means. 100% of the materials needed for construction can be supplied to a new purpose.

By using photovoltaically active surfaces, the energy required for construction and operation of the "airship" can even be produced decentrally. Here as well, the photovoltaic elements which are used can subsequently ensure a basic provision in situ.

The advantages achieved by the invention are in particular that the use of a structural element having a vacuum-based sandwich structure allows a particularly light and thermally insulating construction of a building at a low expense. This is achieved in particular by the use of the positive characteristics of the vacuum: the pressure difference between atmosphere and vacuum provides a stabilisation of the structural element by force locking at a pressure of 1 kg/m². Evacuation also produces a weight reduction of 1.2 kg/m³.

The modular construction method with assembly of the structural element in situ, i.e. at the construction site and not at the production site affords the further advantage that structural elements with one or more sensitive surfaces can be transported in single parts to the installation or erection site. The "visible surfaces" can then finally be fitted at the end of all the other tasks—the risk of damage is minimised.

A further advantage is that the visible surfaces (but also other parts of the structural element) can be easily replaced, depending on the type of attachment. Thus, an optical change can be realised in a simple manner and is merely restricted to the exchangeable visible surface, all the further parts of the structural element can be retained unchanged. In contrast to, for example, the re-painting of a visible surface, the replacement provides considerable advantages in terms of time because the preparation of the substrate and drying times of paints are irrelevant. The dependence on suitable weather conditions is reduced considerably. Overall, the replacement and recycling of a thin-walled, visible surface is also to be preferred for energy reasons to a complex processing.

Furthermore, the structural element is outstandingly thermally insulating; the three types of heat transfer are heat conduction, convection and radiation. Convection is prevented by a rough vacuum; even heat conduction via the gas is prevented by a high vacuum. If a suitable porous material is used for the surfaces, a molecular flow can also be achieved so that heat conduction via the gas is also prevented above a high vacuum. The heat conduction of air at 20° C. is approximately 0.0262 W/mK, increasing at 400° C. to approximately 0.040 W/mK. The heat conduction of air is thus lower, even significantly lower than that of most commercially available insulating materials and is also distinguished by a lower temperature dependence. In contrast to insulating materials, heat radiation is not restricted, but can be reduced and even almost prevented, for example by individual reflecting layers as far as MLIs (multi-layer insulation). Heat conduction via the necessary core structure for evacuated sandwich panels, for example, must be considered and is subject to the type of material used and to the proportion in terms of surface area of the finished element taken up by this core structure. Due to a "thermal uncoupling", for example by elastomers at the transition of cover layers to core layer, further heat transfer resistances can be achieved which further reduce the total energy transmission.

Thus, in the case of thicker evacuated components, a rough vacuum which can be produced using relatively simple vacuum pumps can provide an outstanding heat insulation which, in spite of dispensing with commercially available insulating materials, is superior to most solutions realised today. Considered in terms of total energy, the advantage is significantly greater, since production as well as transportation, installation and later disposal of insulating materials present considerable environmental pollution.

The invention also provides additional advantages in respect of the stability of a construction, for example, since here the rough vacuum insulating layer simultaneously even has a stabilising effect and is not an additional static load, as are prior art insulating material systems. Likewise, the problem of soaking does not exist for the efficiency of the insulation. In contrast to conventional insulating materials, rough vacuum insulation can thus be used in all climate zones and is also generally suitable, for example, as perimeter insulation.

A further advantage is that, for example, on the corners of houses, the insulation can be guided "seamlessly around the corner" and thermal bridges, which occur in conventional insulating systems particularly at the edges of angles, are prevented from forming. Advantages are also provided in respect of sound insulation, since a vacuum does not transmit sound.

Furthermore, all materials located inside the vacuum are protected against dust, corrosion or other environmental influences. Also, living organisms cannot survive and mould cannot propagate in a vacuum. Simple pressure measuring devices can check the intactness of the sheath. Thus, for example in the case of intrusion detection systems, no additional cost-intensive measurement methods are required.

In addition to the advantages of the sandwich construction method, in the case of permanent evacuation of the components, a further static advantage is also important in the invention: due to atmospheric pressure, prestressing is provided which acts uniformly on the component, does not require an abutment or the like, does not cause any tension peaks and the effect of which can be controlled by a very simple pressure measurement. Prestressing is mainly used today in reinforced concrete construction and for membrane structures; in steel construction this principle is still not very widespread. Prestressing provides many advantages which can be transferred from steel construction. These are a reduction in consumption of normal steel, simultaneously with a low consumption of high-grade prestressing steel and thereby a reduction in cost of the entire construction, the possibility of great spans of up to several hundred meters, reduction in component measurements, increase in rigidity of the entire construction due to a reduction in bending, reduction in deformation of components and the ability to influence cutting conditions and deformations.

An example of such a use with an evacuated structure is provided by the rotor blades of wind turbines. According to the prior art, these are produced as a complete component in a sandwich construction. These components, some of which are over 50 m in size impose very high demands on production and logistics and are not fault-tolerant. Damage to components often means that they have to be replaced, since repairs are only possible to a limited extent. Moreover, the recycling ability of products of a sandwich construction is very low because the processed materials cannot easily be separated according to type.

The examination of large-area components, such as the rotor blades of wind turbines, is also very complex and very time consuming. Electrically conductive layers which allow monitoring to check for possible damage and offer an additional de-icing function increase complexity and production costs.

However, if a rotor blade is configured with a basic structure of evacuated hollow chamber profiles according to the invention and is subsequently provided with cover layers and interlying spacers and if this resulting sandwich is then also evacuated, a considerable cost-reducing potential is provided. As mentioned, the components can be assembled in situ without a great logistical effort. A defect in a segment can be immediately detected by permanently connected vacuum measuring devices. Compared to conventional construction methods, eliminating this defect requires only a minimum expense, since all that needs to be done is for a small segment to be replaced.

Atmospheric pressure which acts uniformly on the entire component (excess pressure and vacuum which act on the rotor blade during operation change this value), in conjunction with flexible elastomers (for example elastomers between cover layer and hollow chamber profile and possibly also between cover layers and core structure) provide a stability free from stress peaks.

Furthermore, in the event of fire, an evacuatable element according to the invention is outstandingly suited to being flooded with a suitable flame retardant or with a cooling foam. In the case of a multilayered structure of the element, this can also be carried out in a targeted manner according to the respective situation in the individual layers. Thus for example, an outer low-flammable to non-flammable layer can be flooded once or even in circulation with, for example a cooling foam or a cooling liquid and thereby the heat conduction to the adjoining layers can be greatly reduced. This offers not only protection for adjoining rooms, since the spread of fire is delayed and even prevented, but supporting structures can also be protected. The failure of steel girders, for example, can thus be delayed and even prevented.

BRIEF DESCRIPTION OF THE DRAWING

An embodiment of the invention will be described in detail with reference to the drawings, in which.

DETAILED DESCRIPTION OF PREFERRED EMBODIMENTS

In all the figures, the same parts have been provided with the same reference numerals.

Figure 1:
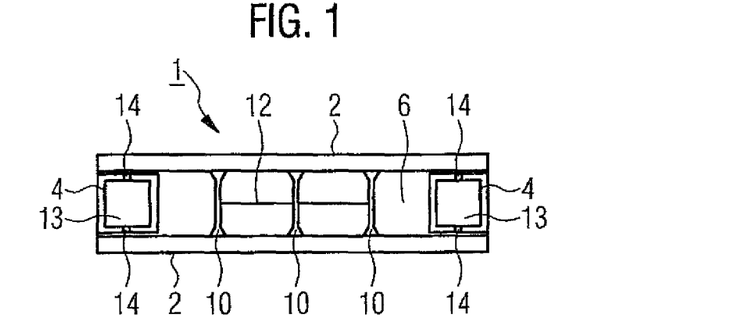
FIG. 1 shows a cross section through a structural element.

FIG. 1 shows a cross section through a structural element 1. It comprises cover layers 2, constructed as fixed boards and arranged parallel to one another, and a frame structure 4 which forms the edge, is closed peripherally and thus forms a cavity 6. Since the frame structure 4 is formed integrally with the cover layers 2, the cavity can be sealed in a gastight manner. Furthermore, arranged in the cavity 6 are spacer elements 10 configured as cylinders which become thicker at their ends. They are arranged vertically to the cover layers 2 and stabilise the spacing of the cover layers 2 relative to one another.

During assembly, cover layers 2, frame structure 4 and spacer elements 10 are supplied separately. Cover layers 2 and frame structure 4 can thus be transported in a space-saving manner. The spacer elements 10 are interconnected by a lattice structure 12 so that they can also be transported in a practical and stackable manner. The individual parts are arranged on one another in situ at the construction site and the cavity 6 is evacuated by a vacuum pump (not shown). The opening via which the vacuum pump was connected is closed appropriately. Alternatively, a permanently operating vacuum pump can be connected. This has the advantage of permanently equalising the inevitably occurring leakage rate.

The connection and gastight closure of the cavity 6 against the exterior space is already achieved by the force locking effect of the atmospheric pressure on the cover boards 2. A connection means, for example an adhesive or a mechanical connection, can also be provided to maintain stability if vacuum is lost.

To allow a high vacuum to also be permanently maintained in the cavity 6, which high vacuum has particularly positive insulation characteristics, the frame structure 4 has a chamber 13. Said chamber 13 has openings 14 which extend to the layer connecting the cover layers 2 to the frame structure 4. The chamber 13 is kept permanently at a rough vacuum pressure level by a vacuum pump (not shown). The openings 14 which are sealed against the outside environment and against the cavity 6 by the connection layer between frame structure 4 and cover layers 2 thereby form an intermediate pressure level between external pressure and high vacuum level of the cavity 6, thereby reducing the leakage rate.

Figure 2:
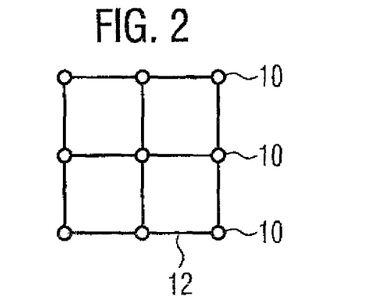
FIG. 2 shows a cross section through a structural element having curved cover layers.

FIG. 2 shows an alternative embodiment of the structural element 1 with curved cover layers 2. The frame structure 4 is not shown here. A curved cover layer 2 results in greater stability.

Figure 3:
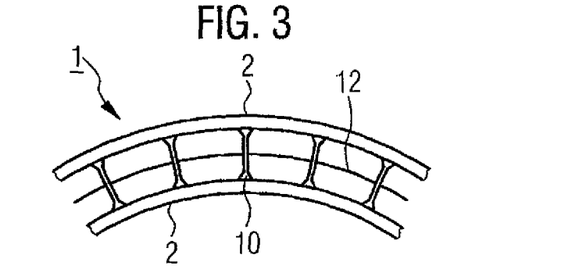
FIG. 3 shows a plan view of a plurality of spacer elements connected in the manner of a lattice.

FIG. 3 shows a plan view of the spacer elements 10 in a 3×3 arrangement. Any desired larger arrangements are possible.

Due to the connection with the lattice structure 12, the spacer elements 10 can easily be stacked one inside another and can thereby be transported in a space-saving manner. The spacer elements can also be pushed together by hinges between the spacer elements 10 and the lattice structures 12.

Figure 4:
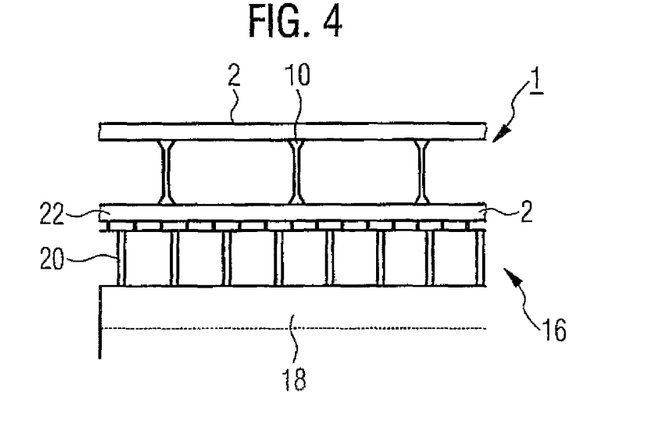
FIG. 4 shows a cross section through a structural element and an outer mould.

Finally, FIG. 4 shows an embodiment of the invention with non-forming cover layers 2. Said layers are arranged on an outer mould 16 which is configured as a vacuum table and substantially comprises a fixed base plate 18 and a perforated plate 22 arranged thereon with supports 20. The region under the perforated plate 22 can be evacuated. Thus, the still flexible cover layer 2 can be arranged on the outer mould 16 and adapted to the mould by atmospheric pressure and can thus be formed. Following evacuation of the structural element 1, it is kept in the form by atmospheric pressure.

What is claimed is:

1. A structural element, comprising:
   two cover layers arranged in substantially parallel relationship to one another; and
   a closed frame structure formed integrally with the cover layers and arranged between the cover layers such that a gastight cavity is formed, said cavity containing a vacuum, said frame structure having a chamber containing a vacuum having a pressure which is higher than a pressure of the cavity.

2. The structural element of claim 1, further comprising a spacer element arranged between the cover layers.

3. The structural element of claim 2, wherein the spacer element is configured in the form of a bar and extends vertically to a surface of the cover layers.

4. The structural element of claim 2, wherein the spacer element has a thickening region on a side facing the cover layers.

5. The structural element of claim 2, further comprising a plurality of said spacer element interconnected in a manner of a lattice.

6. The structural element of claim 2, further comprising a connector placed between the cover layers and the frame structure or between the cover layers and the spacer element.

7. The structural element of claim 6, wherein the connector includes an adhesive bond.

8. The structural element of claim 6, wherein the connector includes a mechanically separable connection.

9. The structural element of claim 2, further comprising a material introduced between the cover layers and the frame structure or between the cover layers and the spacer element for increasing a coefficient of static friction.

10. The structural element of claim 2, further comprising a material introduced between the cover layers and the frame structure or between the cover layers and the spacer element for increasing a coefficient of static friction, when exposed to pressure.

11. The structural element of claim 1, wherein the cover layers have a curved configuration.

12. The structural element of claim 1, further comprising a gastight partition wall placed in the cavity.

13. The structural element of claim 12, wherein the partition wall has an opening which is sealable in a gastight manner.

14. The structural element of claim 1, further comprising a porous material, preferably a pourable, pressure-resistant material, arranged between the cover layers.

15. The structural element of claim 1, further comprising a pipe connected to an outer region and arranged in the cavity or the chamber.

16. The structural element of claim 1, further comprising a pipe integrated into the cover layers and configured as a heat exchanger.

17. A method for producing a structural element, comprising:
    arranging two cover layers in parallel relation to one another;
    placing a closed frame structure, having a chamber, between the cover layers and forming the frame structure onto the cover layers, thereby demarcating a gastight cavity;
    evacuating the chamber of the frame structure to a pressure; and
    evacuating the cavity of the frame to a pressure,
    wherein the pressure in the chamber is higher than the pressure in the cavity.

18. The method of claim 17, further comprising arranging a spacer between the cover layers.

19. The method of claim 17, further comprising arranging the cover layers and the frame structure on an inner or outer mould.

20. A method for equipping a building, comprising arranging on a building a structural element having two cover layers arranged in substantially parallel relationship to one another, and a closed frame structure formed integrally with the cover layers and arranged between the cover layers such that a gastight cavity is formed, said cavity containing a vacuum, said frame structure having a chamber containing a vacuum having a pressure which is higher than a pressure of the cavity, or a structural element, obtained by the method of claim 17.

21. A method of claim 20, wherein one of the cover layers forms a structure already present on the building.

22. An aircraft, comprising a rotationally symmetrical lift body including a structural element having two cover layers arranged in substantially parallel relationship to one another, and a closed frame structure formed integrally with the cover layers and arranged between the cover layers such that a gastight cavity is formed, said cavity containing a vacuum, said frame structure having a chamber containing a vacuum having a pressure which is higher than a pressure of the cavity, or a structural element, obtained by the method of claim 17, said lift body having an interior space which is evacuated.

23. A building, comprising a structural element having two cover layers arranged in substantially parallel relationship to one another, and a closed frame structure formed integrally with the cover layers and arranged between the cover layers such that a gastight cavity is formed, said cavity containing a vacuum, said frame structure having a chamber containing a vacuum having a pressure which is higher than a pressure of the cavity.

24. The building of claim 23, further comprising a framework structure wherein a plurality of said structural element is attached to the framework structure.

25. The building of claim 24, wherein the framework structure is at least partly formed from steel.

26. The building of claim 23, further comprising a vacuum pump connected to the cavity.

27. The building of claim 23, further comprising a component having an interior space which is completely evacuated.

* * * * *